(12) United States Patent
Greig (10) Patent No.: US 10,275,971 B2
(45) Date of Patent: Apr. 30, 2019

(54) IMAGE CORRECTION (71) Applicant: NCR Corporation, Duluth, GA (US)

(72) Inventor: Alan Greig, Perthshire (GB)

(73) Assignee: NCR Corporation, Atlanta, GA (US)

( * ) Notice: Subject to any disclaimer, the term of this patent is extended or adjusted under 35 U.S.C. 154(b) by 399 days.

(21) Appl. No.: 15/135,764

(22) Filed: Apr. 22, 2016

(65) Prior Publication Data

US 2017/0309109 A1    Oct. 26, 2017

(51) Int. Cl.
G07D 7/20 (2016.01)
G06T 5/00 (2006.01)
G07D 7/12 (2016.01)
G06K 9/03 (2006.01)
G07D 7/202 (2016.01)

(52) U.S. Cl.
CPC ........... *G07D 7/2016* (2013.01); *G06K 9/036* (2013.01); *G06T 5/003* (2013.01); *G06T 5/008* (2013.01); *G07D 7/12* (2013.01); *G07D 7/202* (2017.05); *G07D 7/2008* (2013.01)

(58) Field of Classification Search
CPC ........ G07D 7/2016; G07D 7/202; G07D 7/12; G07D 7/2008; G06K 9/036; G06T 5/003; G06T 5/008

See application file for complete search history.

(56) References Cited

U.S. PATENT DOCUMENTS

| | | | | | |
|---|---|---|---|---|---|
| 4,962,425 A | * | 10/1990 | Rea | ........................... | G01J 1/00 348/187 |
| 5,065,444 A | * | 11/1991 | Garber | ..................... | G06T 5/20 348/E5.035 |
| 5,255,331 A | * | 10/1993 | Kelly | ....................... | G07D 7/20 382/112 |
| 5,399,874 A | * | 3/1995 | Gonsalves | ............... | G06K 7/14 250/556 |
| 5,448,656 A | * | 9/1995 | Tanaka | ................... | H04N 1/403 358/3.05 |
| 5,537,615 A | * | 7/1996 | Kelly | ....................... | G06T 5/20 382/112 |
| 6,314,160 B1 | * | 11/2001 | Dhawale | ................ | H04N 5/325 348/E5.088 |
| 6,628,808 B1 | * | 9/2003 | Bach | ....................... | G06K 9/036 235/380 |
| 6,650,789 B2 | * | 11/2003 | Edgar | .................. | H04N 1/4097 382/260 |
| 6,766,045 B2 | * | 7/2004 | Slepyan | .................. | G06T 1/005 340/5.86 |
| 7,009,644 B1 | * | 3/2006 | Sanchez | ............... | H04N 5/2173 348/243 |
| 7,062,079 B2 | * | 6/2006 | Recht | ....................... | G06K 9/38 382/133 |
| 7,068,852 B2 | * | 6/2006 | Braica | ................ | G06K 15/1209 382/266 |
| 7,200,280 B2 | * | 4/2007 | Enomoto | ............. | H04N 1/4097 250/330 |
| 7,257,238 B2 | * | 8/2007 | Prakash | ............. | H04N 1/00002 358/3.26 |

(Continued)

*Primary Examiner* — Manav Seth (74) *Attorney, Agent, or Firm* — Schwegman, Lundberg & Woessner (57) ABSTRACT An image captured for a currency note is preprocessed to correct pixel intensity values to expected pixel intensity values. The corrected image is passed to a currency validator for determining whether the currency not is genuine or non-genuine.

8 Claims, 6 Drawing Sheets (56) References Cited

U.S. PATENT DOCUMENTS

| | | | | |
|---|---|---|---|---|
| 7,494,052 B1* | 2/2009 | Carpenter | G06Q 20/042 | 235/379 |
| 7,639,858 B2* | 12/2009 | Ross | G06K 9/6229 | 356/71 |
| 7,735,721 B1* | 6/2010 | Ma | G06Q 20/042 | 235/379 |
| 7,922,098 B1* | 4/2011 | Ma | G06Q 20/042 | 235/379 |
| 8,162,125 B1* | 4/2012 | Csulits | G07D 7/12 | 194/206 |
| 8,204,293 B2* | 6/2012 | Csulits | G06K 9/033 | 235/379 |
| 8,302,855 B2* | 11/2012 | Ma | G06Q 20/042 | 235/379 |
| 8,391,583 B1* | 3/2013 | Mennie | G07D 7/003 | 209/534 |
| 8,417,017 B1* | 4/2013 | Beutel | G06Q 20/042 | 340/5.86 |
| 8,538,123 B1* | 9/2013 | Csulits | G07D 11/0066 | 235/379 |
| 8,625,875 B2* | 1/2014 | Csulits | G06K 9/033 | 235/379 |
| 8,682,056 B2* | 3/2014 | Ross | G06K 9/2018 | 194/206 |
| 8,805,025 B2* | 8/2014 | Chen | G07D 7/187 | 382/112 |
| 8,983,168 B2* | 3/2015 | Chen | G07D 7/2016 | 382/135 |
| 9,047,723 B2* | 6/2015 | Chen | G07D 7/08 | |
| 9,824,268 B2* | 11/2017 | He | G06K 9/6215 | |
| 2002/0001393 A1* | 1/2002 | Jones | G06K 9/00979 | 382/100 |
| 2003/0169899 A1* | 9/2003 | Slepyan | G06T 1/005 | 382/100 |
| 2003/0178282 A1* | 9/2003 | Bao | G06K 9/00 | 194/328 |
| 2004/0131242 A1* | 7/2004 | Klevtsov | G07D 7/12 | 382/137 |
| 2004/0247169 A1* | 12/2004 | Ross | G06K 9/6229 | 382/137 |
| 2005/0133584 A1* | 6/2005 | Finnerty | G06K 7/143 | 235/375 |
| 2006/0210138 A1* | 9/2006 | Hilton | G06K 9/036 | 382/137 |
| 2007/0154078 A1* | 7/2007 | He | G06K 9/00 | 382/135 |
| 2009/0252381 A1* | 10/2009 | Nishikawa | G06K 9/036 | 382/112 |
| 2009/0263020 A1* | 10/2009 | Hamasaki | G06T 7/0004 | 382/181 |
| 2009/0324053 A1* | 12/2009 | Ross | G06K 9/2018 | 382/137 |
| 2009/0324084 A1* | 12/2009 | Ross | G07D 7/187 | 382/190 |
| 2010/0116619 A1* | 5/2010 | Jones | G07D 11/0066 | 194/217 |
| 2011/0019881 A1* | 1/2011 | Natori | G07D 7/187 | 382/112 |
| 2013/0022231 A1* | 1/2013 | Nepomniachtchi | G06Q 20/042 | 382/102 |
| 2013/0259301 A1* | 10/2013 | Chen | G07D 7/187 | 382/103 |
| 2014/0369590 A1* | 12/2014 | He | G07D 7/04 | 382/135 |
| 2015/0117746 A1* | 4/2015 | Chen | G07D 7/08 | 382/135 |

* cited by examiner

IMAGE CORRECTION

BACKGROUND

Digital cameras and scanners are used for imaging objects. The resulting image of the object can then be image processed for a variety of reasons.

One very important image processing that takes place following the capture of an object image is for determining note authenticity. Automated Teller Machines (ATMs) and vending machines that accept cash for deposit or for payment of vended goods must determine if the note being provided by a consumer is genuine in a relatively short period of time.

In-line imaging scanners, along the note transport path within the machine, typically have a fixed position for capturing the image of a note. If the scanner lens has a small amount of debris or if the note being imaged is not properly centered, some portions of the image can become distorted. The determination as to whether a note is genuine or not relies on the pixel intensities in the note image, such that when the note is not properly illuminated, centered, or when a portion of the lens has debris, then some parts of the note image will have incorrect pixel intensities, which will alter the determination of whether the note is genuine or not.

Moreover, any resulting non-uniformly illuminated image degrades the algorithm performance in discriminating between a genuine note and a non-genuine note. As a consequence, a trade-off has to be made in these situations between false retention of genuine notes and false acceptance of non-genuine notes.

This is not an ideal situation for vending machines accepting currency as payment for vended goods and very problematic for ATMs that can handle large amounts of currency in any given day.

Processing throughput is a concern but so is getting the note's authenticity correct because errors in the favor of a customer can be costly to the enterprise and errors in favor of the enterprise can result in manual enterprise exception procedures with customer complaints and frustration.

SUMMARY

In various embodiments, methods for image processing within a valuable media depository and a valuable media depository are provided.

According to an embodiment, a method for image processing within a valuable media depository is presented. Specifically, pixel intensity values for pixels of an image are identified that are outside a range for a currency note that the image represents. Next, the pixel intensity values for the corresponding identified pixels are corrected to fall within the range and thereby creating a modified image.

DETAILED DESCRIPTION

Figure 1A:
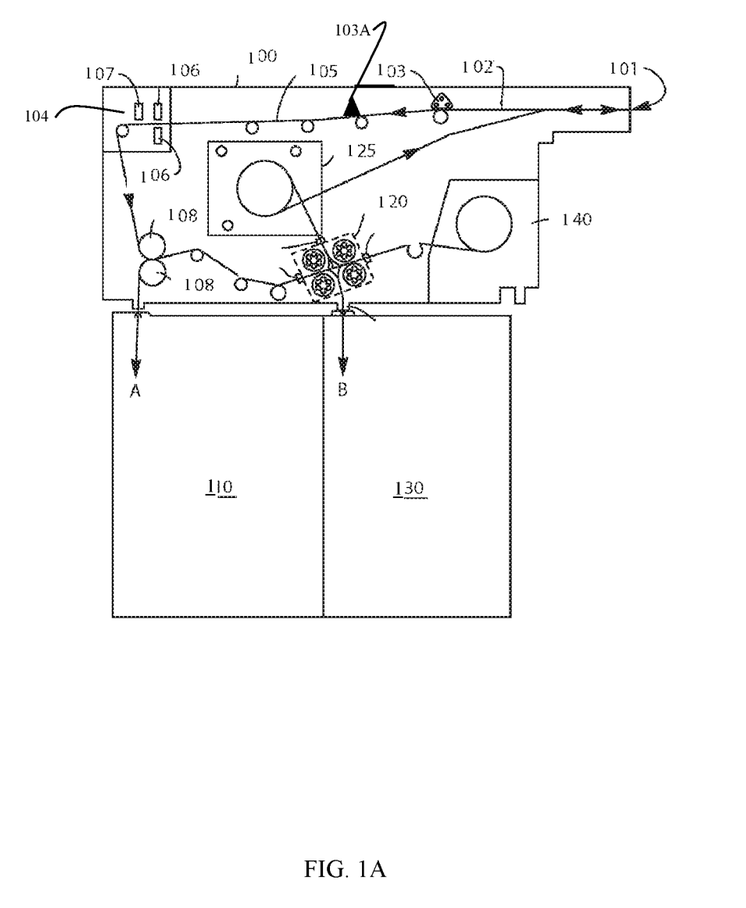
FIG. 1A is a diagram depicting a deposit module of a Self-Service Terminal (SST) having a scanner module, according to an example embodiment.

FIG. 1A is a diagram depicting a one-sided view of a valuable media depository 100, according to an example embodiment (also referred to as a deposit module). It is to be noted that the valuable media depository is shown with only those components relevant to understanding what has been added and modified to a conventional depository for purposes of image correction processing during currency note authentication within the depository 100.

The depository 100 is suitable for use within an Automated Teller Machine (ATM), which can be utilized to process deposited banknotes and checks (valuable media as a mixed bunch if desired). The deposit module 100 has an access mouth 101 (media or document infeed) through which incoming checks and/or banknotes are deposited or outgoing checks and/or banknotes are dispensed. This mouth 101 is aligned with an infeed aperture in the fascia of the ATM in which the depository 100 is located, which thus provides an input/output slot to the customer. A bunch (stack) of one or more items (valuable media) is input or output. Incoming checks and/or banknotes follow a first transport path 102 away from the mouth 101 in a substantially horizontal direction from right to left shown in the FIG. 1A. They then pass through a separator 103 and from the separator to a deskew module 103A along another pathway portion 105, which is also substantially horizontal and right to left. The items are now de-skewed and believed-to-be aligned for reading by imaging cameras (inline scanners) 106 and a Magnetic Ink Character Recognition (MICR) reader 107.

The inline scanners 106 and MICR reader are included within a scanner module 104 that also includes image processing for authenticating the banknotes being transported as being genuine or non-genuine. As will be described in greater detail herein and below (with the FIGS. 1B-1C and 2-4), the image processing within scanner module 104 is enhanced with novel image correction processing before the images are authenticated within the scanner module 104.

Items are then are directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1A), or during another mode of operation, the rollers can be rotated in an opposite fashion to direct processed checks and/or banknotes downwards in the direction shown by arrow A in the FIG. 1A into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1A) into a re-buncher unit 125, or downwards in the direction of arrow B in the FIG. 1A into a cash bin 130, or to the right hand side shown in the FIG. 1A into an escrow 140. Items of media from the escrow 140 can selectively be removed from the drum and re-processed after temporary storage. This results in items of media moving from the escrow 140 towards the left hand side of the FIG. 1A where again they will enter the diverter mechanism 120. The diverter mechanism 120 can be utilized to allow the transported checks and/or banknotes to move substantially unimpeded towards the left hand side and thus the nip rollers 108 or upwards towards the re-buncher 125. Currency notes from the escrow can be directed to the re-buncher 125 or downwards into the banknote bin 130.

As used herein, the phrase "valuable media" refers to media of value, such as currency, coupons, checks, negotiable instruments, value tickets, and the like.

For purposes of the discussions that follow with respect to the FIGS. 1A-1C and 2-4, "valuable media" is referred to as currency and the "valuable media depository" is referred to as a "depository." Additionally, valuable media may be referred to as a "document" herein.

Figure 1B:
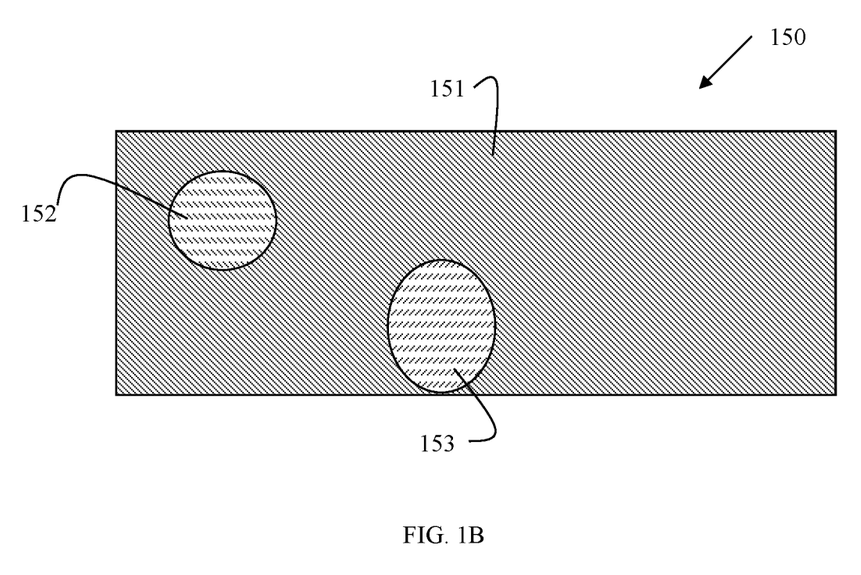
FIG. 1B is a diagram illustrating an image of a currency note having blurred areas with improper pixel intensities, according to an example embodiment.

FIG. 1B is a diagram illustrating an image of a currency note 150 having blurred areas with improper pixel intensities, according to an example embodiment.

The image includes pixel areas 151 that have expected pixel intensity values and non-linear pixel areas 152 and 153 that have unexpected pixel intensity values. That is, the image processing within the scanner module 104, which performs currency validation, is configured to rely on the image pixel intensity attribute values to be within a pre-defined range (expected pixel intensity values). The expected pixel intensity values are an indication that currency was properly illuminated and/or properly centered when the image 150 was captured by the inline scanner 106.

However, for whatever reason some non-linear areas within the image have unexpected (outside the predefined range) pixel intensity values 152 and 153.

With the teachings presented herein and below, these identified unexpected pixel intensity values 152 and 153 are preprocessed and corrected to pixel intensity values within the predefined range of expected pixel intensity values before the scanner module 104 performs further image processing to validate the currency (though currency validation on the image of the currency 150).

Figure 1C:
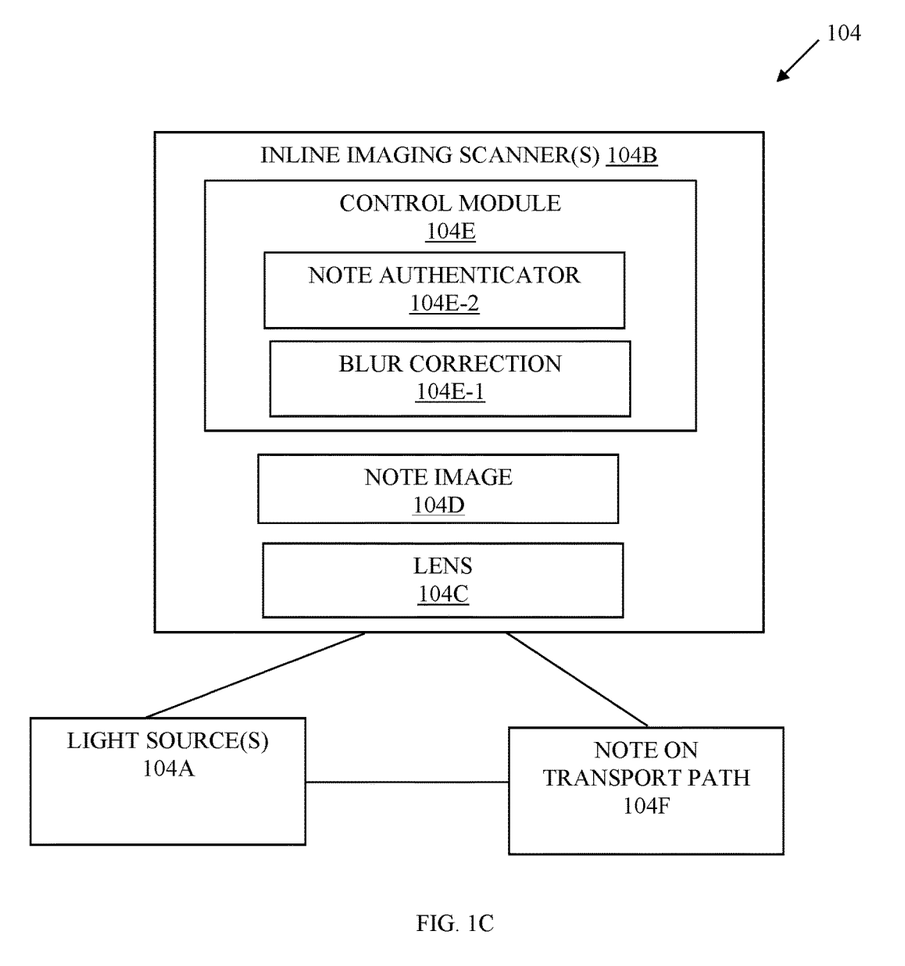
FIG. 1C is a diagram depicting a scanner module of a SST, according to an example embodiment.

FIG. 1C is a diagram depicting a scanner module 104 of a SST, according to an example embodiment.

Only those components of the scanner module 104 that are necessary for understanding the teachings presented herein are labeled in the FIG. 1C.

The scanner module 104 includes a variety of physical hardware and software modules that execute on one or more hardware processors. The scanner module 104 includes one or more light sources 104A and one or more inline imagining scanners 104B.

The inline imaging scanners 104B include a lens 104C, storage and/or memory for housing a note image 104D for the note 104F, and a control module 104E.

The control module 104E includes a new and novel blur correction processing module 104E-1 (herein after "blur correction 104E-1") and a note authenticator module 104E (hereinafter "note authenticator 104E-2").

During operation, the currency note 104F is transported along the pathway 104 and enters the scanning module 104. Sensors detect the presence of the currency 104F which triggers the controller 104E to activate the light sources 104A to illuminate the currency 104F. The lens 104C then captures one or more images of the currency 104D.

Conventionally, the image 104D would then be processed by the note authenticator 104E-2 regardless of whether the image 104D has any unexpected pixel intensity values (such as was discussed above in the FIG. 1B (pixel intensity values 152 and 153)). This conventional processing is altered with blur correction 104E-1 pre-processing the image 104D to perform correction on those unexpected pixel intensity values before the image 104D is processed by the note authenticator 104E-2.

As stated before, some pixel intensity values can appear in the note image for a variety of reasons, such as the note 104F not being properly aligned and centered on the pathway 105, incorrect illumination from the light sources 104A, debris on a portion of the lens 104C, and the like. In fact, conventional camera systems employed in currency validation have a narrow depth of field and the movement of the currency 104F relative to the camera results in a variation in the out-of-focus blur portions within the image 104D. This can be identified within the image 104D based on the unexpected pixel intensity values detected within the image 104D.

Since the light source 104A is co-located with the scanner module 104 (imaging and/or camera system), any change in the out-of-focus blur will also be proportional to the change in illumination level detected within the image.

Accordingly, blur correction 104E-1 subdivides the image 104D into a matrix of snippets (the size of each snippet can be configured as a function of the overall size of the image 104D in pixel density). So, as one example, a 2 MB overall image size can be configured to break the image 104D into 50 matrixes of smaller pixel areas, whereas a 4 MB overall image size can be configured to break the image into 100 matrixes of smaller pixel areas.

Blur correction 104E-1, then inspects the snippets for pixel intensity values that are unexpected (outside the pre-determined range of expected pixel intensity values). A Modulation Transfer Function is then performed on any pixel intensity values that are of unexpected values for each snippet to determine pixel illumination correction factors that would correct those pixels to have pixel intensity values within the expected range of values. For example, pixel brightness factors and/or pixel contrast values may be identified for correcting the intensity values by the Modulation Transfer Function. Blur correction 104E-1 then applies the correction factors to the unexpected pixel intensity values on the affected pixels within the snippets within the image 104D (creating a modified image 104D).

The corrected and pre-processed image 104D is then passed to the note authenticator 104E-2 for determining whether the note 104F is genuine or non-genuine. By quantifying the out-of-focus blur the image 104D can be derived and modified with effective uniform illumination (pixel intensity values that are all within the expected range) along and across the note 104F (in a non-linear manner) to produce an image 104D that can be handled without exception processing (defaulting to validated or not validated) being needed by the note authenticator 104E-2.

It is to be noted that each snippet can have: 1) expected pixel intensity values and unexpected intensity values, 2) all expected pixel intensity values, or 3) all unexpected pixel intensity values. Thus, the unexpected pixel intensity values 152 and 153 can be wholly contained within a single snippet or span multiple snippets (two or more).

With the scanner module 104 presented, the programmed processing of the controller 104E within a mother board of the scanner module 104 for the blur correction 104E-1 is now discussed with reference to the FIGS. 2-4.

Figure 2:
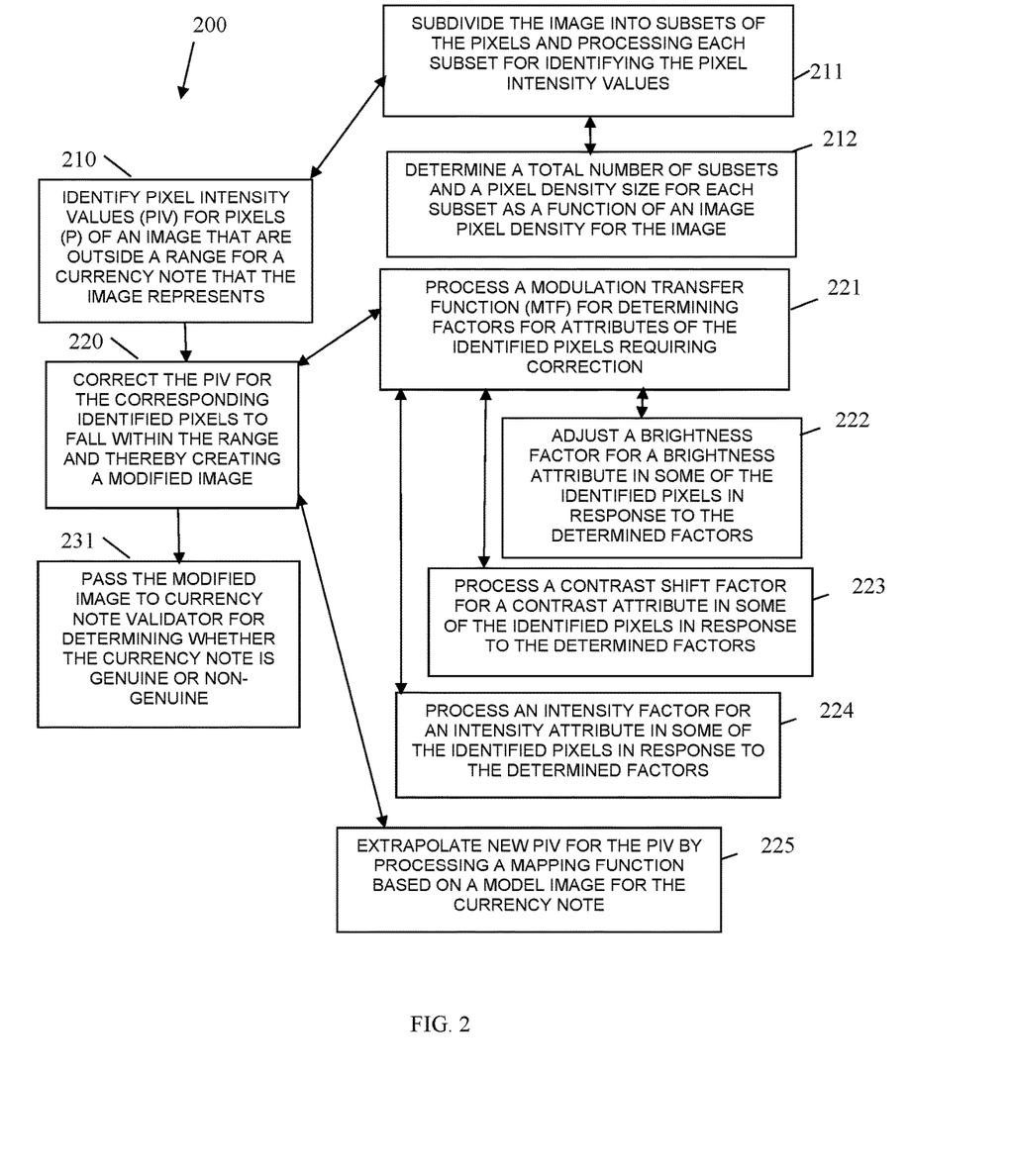
FIG. 2 is a diagram of a method for image processing, according to an example embodiment.

FIG. 2 is a diagram of a method 200 for image processing, according to an example embodiment. The method 200 when processed performs pre-processing image correction on a currency note image within a valuable media depository. The method 200 is implemented as executed instructions representing one or more software modules referred to as "image corrector." The instructions reside in a non-transitory computer-readable storage medium and are executed by one or more processors of the valuable media depository.

In an embodiment, the image corrector is executed by one or more processors of the scanner module 104 integrated within the valuable media depository 100.

In an embodiment, the media depository is a deposit module.

In an embodiment, the media depository is a recycler module.

In an embodiment, the media depository is a peripheral device integrated into an SST. In an embodiment, the SST is an ATM. In an embodiment, the SST is a kiosk. In an embodiment, the SST is a vending machine. In an embodiment, the SST is a self-service retail checkout station.

In an embodiment, the media depository is a peripheral device integrated into a Point-Of-Sale (POS) terminal.

In an embodiment, the image corrector is the blur correction module 104E-1.

At 210, image corrector identifies pixel intensity values for pixels of an image that are outside a range from a currency note that the image represents. In an embodiment, the range is a predefined range determined based on expected intensity values for a lighting source that illuminates the currency note before the image is captured by a scanner. In an embodiment, the range is a predefined range determined based on expected intensity values for a lighting source that illuminates the currency note and based on angles of the image taken of the currency note on a transport path (that assumes the currency note is centered and aligned on the transport path).

In an embodiment, the change in the out-of-focus blur identified in the pixels of the image is a proportional to change in illumination level from which the image is taken using the lighting source and detectable from the pixel intensity values of the pixels within the image.

According to an embodiment, at 211, the image corrector subdivides the image into subsets of pixels and processes each subset for identifying the pixel intensity values. This permits more efficient processing throughput within the processor of the device that executes the image corrector and permits more efficient memory usage by permitting each subdivision to be processed in parallel and concurrently to one another using multiple processors and/or by permitting chunks of the pixels for the image to be processed in smaller sizes. This was also discussed above with reference to the FIG. 1C as snippets.

In an embodiment of 211 and at 212, the image corrector determines a total number of subsets and a pixel density for each subset as a function of an image pixel density from the image. Thus, the size of each subset and the total number of subset can dynamically change and dynamically adjust as the size (density) of pixels in the image changes. This may occur when the scanner that captures the image is upgraded to take images at higher pixilation densities without having to update the instructions of the image corrector.

At 220, the image corrector corrects the pixel intensity values for the corresponding identified pixels (those that are outside the expected range) to ensure that those pixels have pixel intensity values that fall within the expected range. The image corrector creates a modified version of the image when correcting the pixel intensity values in the image.

In an embodiment, at 221, the image corrector processes a Modulation Transfer function for determining factors for attributes of the identified pixels that require correction. This was discussed above with reference to the FIG. 1C.

In an embodiment of 221 and at 222, the image corrector adjust a brightness factor for a brightness attribute in some of the identified pixels in response to output provided by the Modulation Transfer function that determines the factors.

In an embodiment of 221 and at 223, the image corrector processes a contrast shift factor for a contrast attribute in some of the identified pixels in response to output provided by the Modulation Transfer function that determines the factors.

In an embodiment of 221 and at 224, the image corrector processes an intensity factor for an intensity attribute in some of the identified pixels in response to output provided by the Modulation Transfer function that determines the factors.

It is to be noted, that some identified pixels can include just one, all, or some combination of the processing described at 222-224, such that this processing is not mutually exclusive for any given identified pixel requiring correction.

According to an embodiment, at 225, the image corrector extrapolates new pixel intensity values for the identified pixel intensity values by processing a mapping function based on a model image for the currency note taken under an expected illumination level by the lighting sources within the scanner.

In an embodiment, at 231, the image corrector passes the modified image to a currency note validator for determining whether the currency note is genuine or non-genuine. In an embodiment, the currency note validator is the note authenticator 104E-2.

Figure 3:
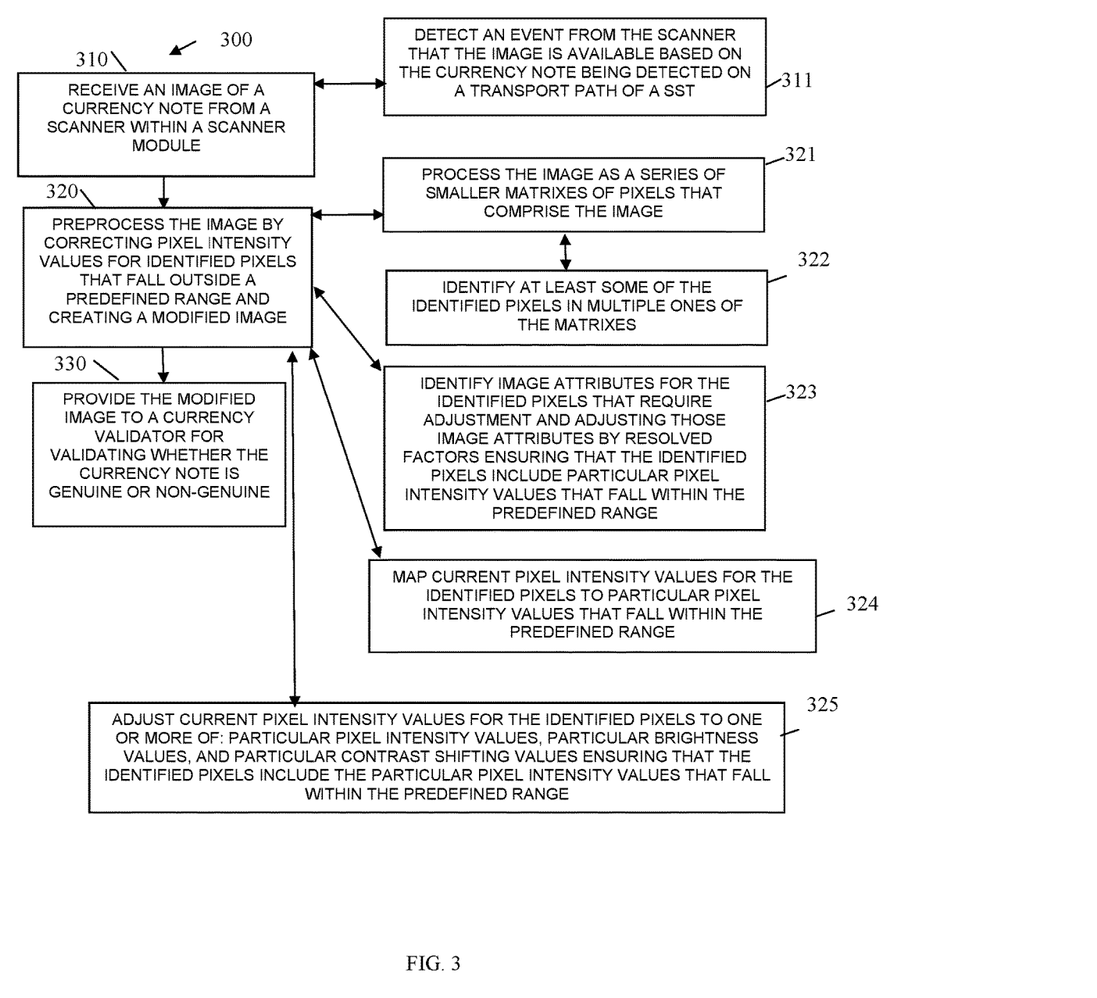
FIG. 3 is a diagram of another method for image processing, according to an example embodiment.

FIG. 3 is a diagram of another method 300 for image processing, according to an example embodiment. The method 200 when processed performs pre-processing image correction on a currency note image within a valuable media depository. The method 200 is implemented as executed instructions representing one or more software modules referred to as an "image preprocessor." The instructions reside in a non-transitory computer-readable medium and are executed by one or more processors of the valuable media depository.

In an embodiment, the image preprocessor is executed by one or more processors of the controller 104E integrated within a valuable media depository 100.

In an embodiment, the media depository is a deposit module.

In an embodiment, the media depository is a recycler module.

In an embodiment, the media depository is a peripheral device integrated into an SST. In an embodiment, the SST is an ATM. In an embodiment, the SST is a kiosk. In an embodiment, the SST is a vending machine. In an embodiment, the SST is a self-service retail checkout station.

In an embodiment, the media depository is a peripheral device integrated into a Point-Of-Sale (POS) terminal.

In an embodiment, the image preprocessor is the blur correction module 104E-1.

In an embodiment, image preprocessor presents another and in some ways enhance perspective of the processing depicted in the method 200 (presented above with the discussion of the FIG. 2 and the image corrector).

At 310, the image preprocessor receives an image of a currency note from a scanner within a scanner module. In an embodiment, the scanner module is the scanner module 104.

In an embodiment, at 311, the image preprocessor detects and event from the scanner that the image is available based on the currency note being detected on a transport path of an SST.

At 320, the image preprocessor preprocesses the image by correcting pixel intensity values for identified pixels that fall outside a predefined range and thereby creates a modified image.

In an embodiment, at 321, the image preprocessor processes the image a series of matrixes of pixels that comprise the image. Again, this permits parallel processing on multiple ones of the series of matrixes in parallel, which improves processing throughput and memory load and improves processing based on smaller segments of the image being processed through the processors and memory of the scanner that executes the image preprocessor.

In an embodiment of 321 and at 322, the image preprocessor identifies at least some of the identified pixels in multiple ones of the matrixes. That is a blurred area of the image can span multiple ones of the matrixes.

In an embodiment, at 323, the image preprocessor identifies image attributes for the identified pixels that require adjustment and then adjusts those image attributes by resolved factors. This ensures that the identified pixels include particular (and correct) pixel intensity values that fall within the predefined range (expected range for the pixel intensity values based on the illumination level from which the image was taken and/or based on the currency note being centered and properly aligned on the transport pathway).

In an embodiment, at 324, the image preprocessor maps current pixel intensity values for the identified pixels to particular intensity values that fall within the predefined range (mapping function wherein the processing at 322 and 323 is a transformation function).

In an embodiment, at 325, the image preprocessor adjust current pixel intensity values for the identified pixels to one or more of: particular pixel intensity values, particular brightness values, and/or particular contrast shifting values; thereby ensuring that the identified pixels include the particular pixel intensity values that fall within the predefined range.

Figure 4:
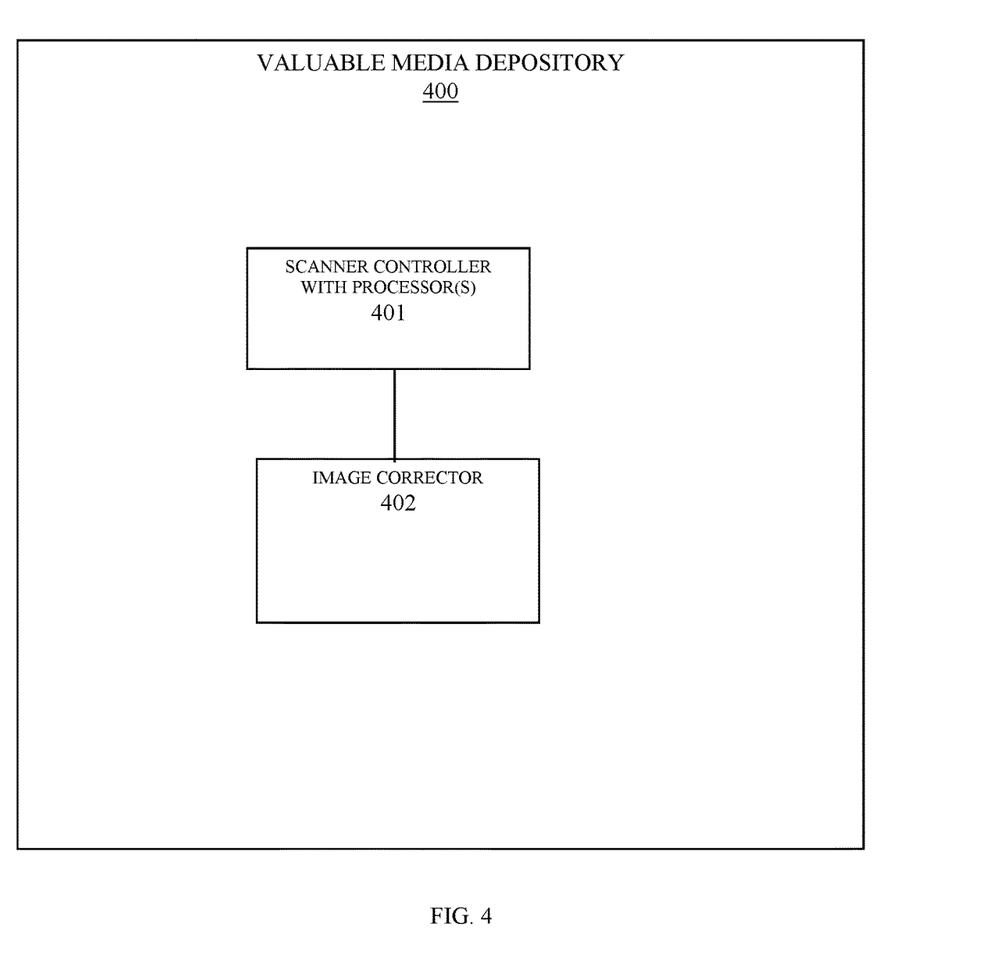
FIG. 4 is a valuable media depository, according to an example embodiment.

FIG. 4 is a valuable media depository 400, according to an example embodiment. The valuable media depository 400 processes valuable media and includes a variety of mechanical, electrical, and software/firmware components, some of which were discussed above with reference to the FIGS. 1A-1C and the FIGS. 2-3.

In an embodiment, the valuable media depository 400 is a deposit module.

In an embodiment, the valuable media depository 400 is a recycler module.

In an embodiment, the valuable media depository 400 is the depository 100.

In an embodiment, the valuable media depository 400 is the depository that performs any of the processing described above with respect to the FIGS. 1A and 1C and the methods 200 and/or 300 of the FIGS. 2-3.

In an embodiment, the valuable media depository 400 is a peripheral device integrated into an SST. In an embodiment, the SST is an ATM. In an embodiment, the SST is a kiosk. In an embodiment, the SST is a vending machine. In an embodiment, the SST is a self-service retail checkout station.

In an embodiment, the valuable media depository 400 is a peripheral device integrated into a Point-Of-Sale (POS) terminal.

The valuable media depository 400 includes a scanning controller with at least one processor 401 including a media transport and an image corrector 402 operable to preprocess images captured by one or more scanners integrated into the valuable media depository 400.

In an embodiment, the scanner controller 401 is the controller 104E.

In an embodiment, the scanner controller 401 is the device that executes any of the methods 200 and 300 of the FIGS. 2 and 3.

The image corrector 402 is configured to: execute on one or more processors of the scanner controller 401, preprocess an image of a currency note to correct pixel intensity values for pixels within the image that fall outside a predefined range, and provide a modified image for the currency note having the corrected pixel intensity values to a currency validator for validating whether the currency note is genuine or non-genuine.

In an embodiment, the image corrector 402 is the image correction module 104E-1.

In an embodiment, the image corrector 402 is the method 200 of the FIG. 2.

In an embodiment, the image corrector 402 is the method 300 of the FIG. 3.

In an embodiment, the currency validator is the note authenticator 104E-2.

In an embodiment, the image corrector 402 is further configured to determine factors for image attributes that require adjustment to correct the pixel intensity values.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    identifying pixel intensity values for pixels of an image that are outside a range for a currency note that the image represents; and
    correcting the pixel intensity values for the corresponding identified pixels to fall within the range and thereby creating a modified image wherein processing a Modulation Transfer function for determining factors for attributes of the identified pixels requiring correction.

2. The method of claim 1 further comprising, passing the modified image to a currency note validator for determining whether the currency note is genuine or non-genuine.

3. The method of claim 1, wherein identifying further includes subdividing the image into subsets of the pixels and processing each subset for identifying the pixel intensity values.

4. The method of claim 3, wherein subdividing further includes determining a total number of subsets and a pixel density size for each subset as a function of an image pixel density for the image.

5. The method of claim 1, wherein processing further includes adjusting a brightness factor for a brightness attribute in some of the identified pixels in response to the determined factors.

6. The method of claim 1, wherein processing further includes processing a contrast shift factor for a contrast attribute in some of the identified pixels in response to the determined factors.

7. The method of claim 1, wherein processing further includes processing an intensity factor for an intensity attribute in some of the identified pixels in response to the determined factors.

8. The method of claim 7, wherein processing further includes extrapolating new pixel intensity values for the pixel intensity values by processing a mapping function based on a model image for the currency note.

* * * * *